W. A. CROWDUS.
MACHINE FOR MAKING STORAGE BATTERY PLATES.
APPLICATION FILED JULY 16, 1913.
1,145,563.
Patented July 6, 1915.
2 SHEETS—SHEET 2.
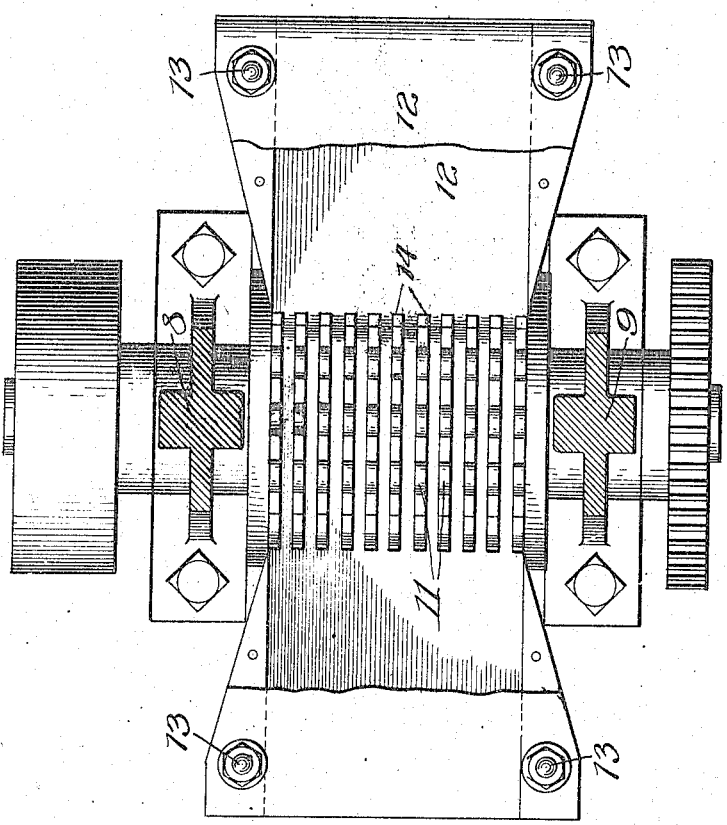
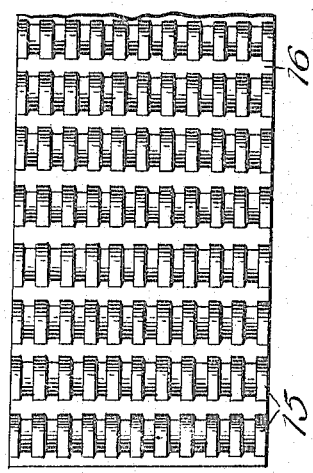
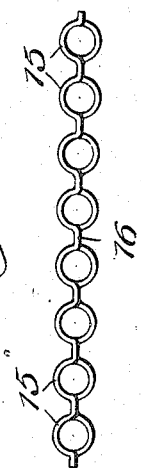
Witnesses:
Inventor:
Walter A. Crowdus,

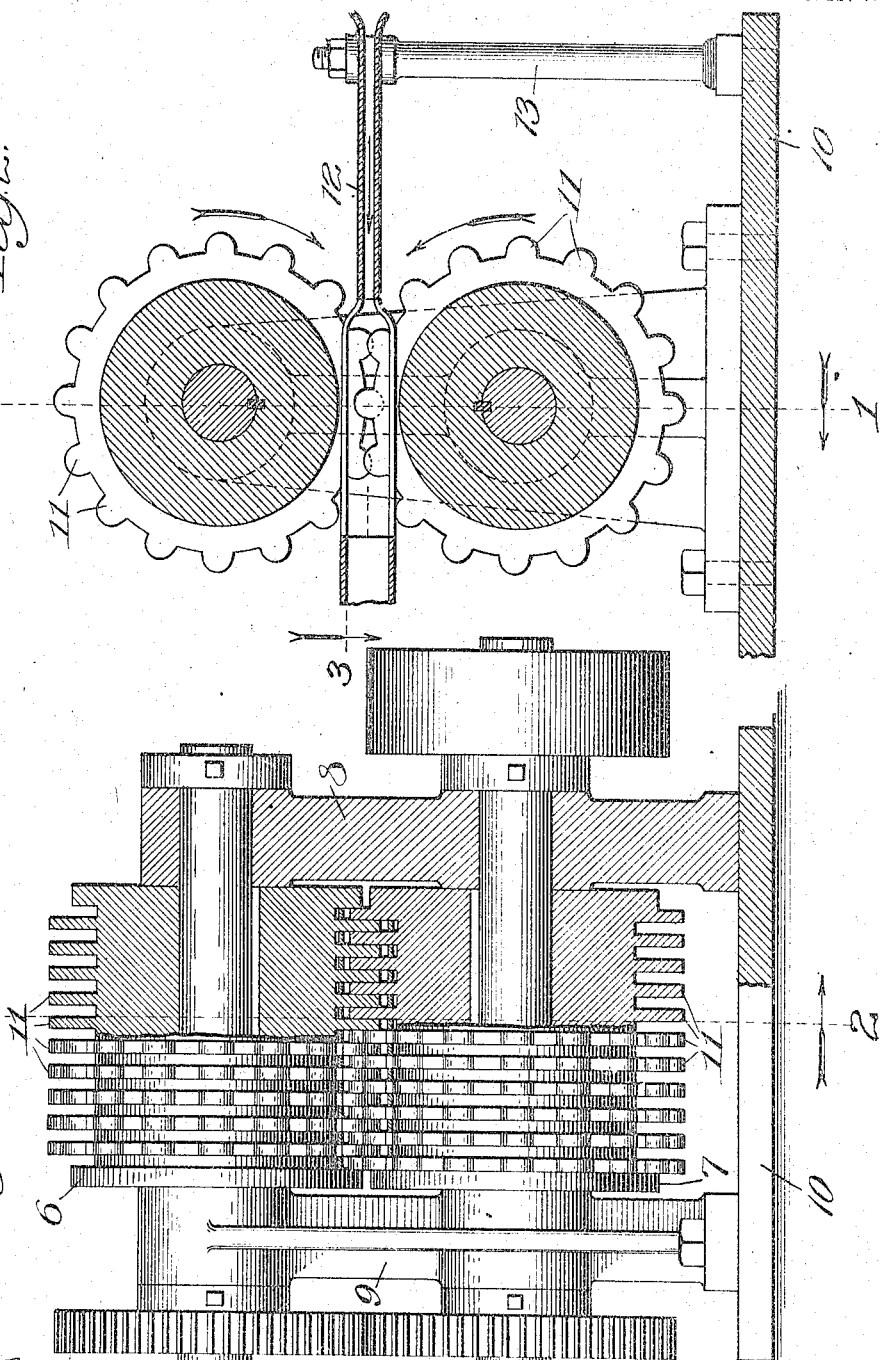

UNITED STATES PATENT OFFICE.

WALTER A. CROWDUS, OF CHICAGO, ILLINOIS, ASSIGNOR TO ALFRED R. PORTER, OF CHICAGO, ILLINOIS.

MACHINE FOR MAKING STORAGE-BATTERY PLATES.

1,145,563.  Specification of Letters Patent.  Patented July 6, 1915.

Application filed July 16, 1913. Serial No. 779,326.

*To all whom it may concern:*

Be it known that I, WALTER A. CROWDUS, a citizen of the United States, residing at Chicago, in the county of Cook and State of Illinois, have invented a new and useful Improvement in Machines for Making Storage-Battery Plates, of which the following is a specification.

My invention relates to an improvement in machines for making the lead supporting plates for the active material, or material to be rendered active, in a storage or secondary battery of the construction shown and described in my application for Letters Patent of the United States, Serial No. 779,325, filed concurrently herewith on the 16th day of July, 1913.

In the accompanying drawing, Figure 1 shows my improved machine in operation by a view in sectional elevation, the section being taken on line 1, Fig. 2; Fig. 2 is a section on line 2, Fig. 1; Fig. 3 is a plan section on line 3, Fig. 2; Fig. 4 is a plan view of a broken length of the lead support made by the machine, and Fig. 5 is an edge-view of the same.

A pair of rolls, 6 and 7, are journaled, respectively, in upper and lower bearings in the side-posts, 8 and 9, of a frame which is bolted to a bed 10. These rolls are geared together, as shown, and the roll 7 carries on an end of its shaft a belt-pulley for driving it. Each roll is provided with annular series of teeth 11, of the rounded and preferably semi-circular or approximately semi-circular shape shown, and uniformly spaced apart. These annular series of teeth, of which ten are shown on each roller, though the number may be greater or smaller, are uniformly spaced apart, and the rolls are relatively disposed in their supporting frame to cause the series of teeth about one to enter the spaces between the series of teeth about the other. A guiding stripper 12 extends between the rolls, being rigidly supported at its flaring ends on four posts 13, as shown. This guiding stripper is formed of two spaced sheets of metal of the flaring shape illustrated in Fig. 3, with the sheets relatively close together at one side of the rolls to afford a guide for a thin sheet of lead (of about $\frac{1}{16}$ inch in thickness) fed thereto, and spaced farther apart from near the point of entry of the sheet of lead between the rolls to their opposite end to guide the sheet, after it has been acted on by the rolls, out of the machine and prevent it from adhering to the teeth of either roll and following it about in its rotation, thereby acting as a stripper. Where the guiding-stripper extends between the rolls, it contains a series of spaced slots 14 to permit the teeth on the two rolls to coöperate through them, these slots being in staggered relation in the upper and lower sheets forming the device 12.

To operate the machine, a sheet of lead, suitable for a support for the active material of a storage-battery, is fed in any desired continuous length through the relatively narrow end of the device 12 between the rolls which, in rotating, force their teeth into the sheet, cut it and expand it into interstitial or latticed tubes at the intervals on the sheet of lead corresponding with the spaces between teeth; these tubes projecting on opposite sides of the teeth and being provided to receive and hold the active material, or material to be rendered active, of a storage-battery, the filled support thus affording an element of the battery.

The sheet of lead acted on by the rolls emerges therefrom in the form represented in Figs. 4 and 5, of a series of interstitial or latticed tubes 15 projecting on each side of the sheet at intervals across which they are connected by webs 16 afforded by the unexpanded sections of the sheet, or sections between and not acted on by the teeth on the rolls.

What I claim as new and desire to secure by Letters Patent is—

A machine for making storage-battery plates having series of interstitial tubes projecting at intervals on the opposite plate surfaces, comprising a pair of journaled rolls geared together, each roll being provided with a series of spaced rings in staggered relation on the opposite rolls and having rounded cutting teeth, the teeth on each roll working in the spaces between the rings on the other, and a guide-stripper formed of two longitudinally slotted sheets widening toward their opposite ends and supported to extend between the rolls in spaced relation to afford a relatively shallow guide at the feed-end and a relatively wide guide and stripper between and beyond the rolls.

WALTER A. CROWDUS.

In presence of—
A. C. FISCHER,
NELLIE B. DEARBORN.